United States Patent [19]
DeArkland

[11] Patent Number: 5,488,656
[45] Date of Patent: Jan. 30, 1996

[54] FACE PLATE WITH AD FRAMES FOR COIN OPERATED TELEPHONE BOXES

[76] Inventor: James R. DeArkland, 8119 Buena Fortuna, Carpinteria, Calif. 93013

[21] Appl. No.: 212,917

[22] Filed: Mar. 15, 1994

[51] Int. Cl.[6] .......................... H04M 17/00; H04M 1/00; G09F 3/00; G09F 15/00
[52] U.S. Cl. .......................... 379/155; 379/447; 379/441; 40/336; 40/611
[58] Field of Search .................................. 379/143, 145, 379/155, 441, 451, 453, 447; 40/336, 584, 371, 611

[56] References Cited

U.S. PATENT DOCUMENTS

| | | | |
|---|---|---|---|
| 2,595,972 | 5/1952 | Naurison | 40/336 |
| 4,895,869 | 7/1989 | Martin | 379/453 X |
| 5,018,291 | 5/1991 | Pasquale et al. | 40/611 X |
| 5,113,435 | 5/1992 | Chen | 379/441 |

*Primary Examiner*—Stephen Chin
*Assistant Examiner*—Paul Loomis
*Attorney, Agent, or Firm*—Philip D. Junkins

[57] ABSTRACT

An improved outer face plate for the principal section of a coin operated telephone unit. The face plate includes at least one external frame member affixed to the face plate proximate one side of the dialing key pad area of the plate. The frame member defines through its periphery a framed panel area and the frame member has a raised rim portion for the positioning and support of an interchangeable advertising panel card. Preferably the face plate of the telephone unit includes two external frame members of rectangular shape with each of the frame members located on one side of the dialing key pad area of the plate.

6 Claims, 1 Drawing Sheet

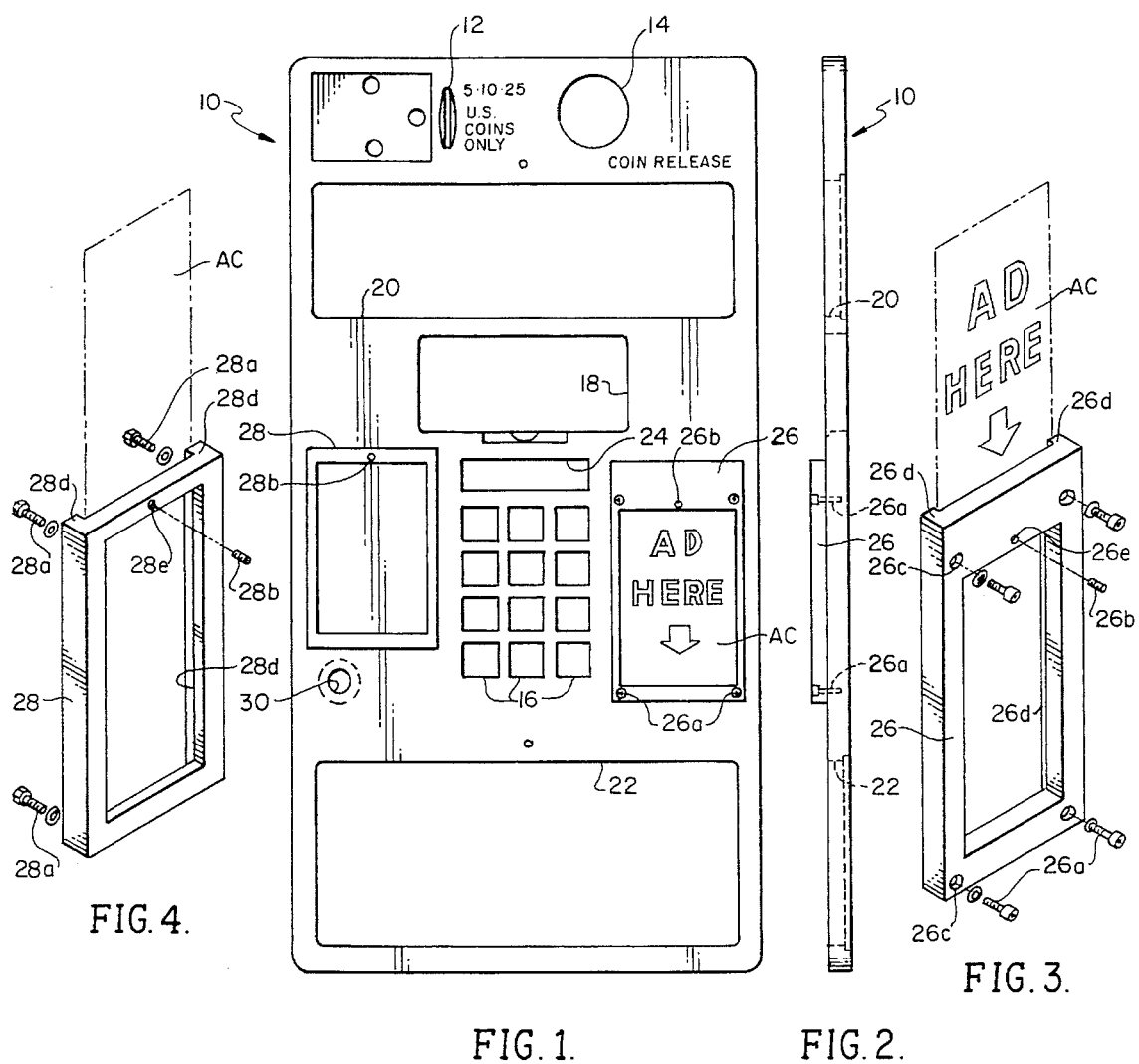

FACE PLATE WITH AD FRAMES FOR COIN OPERATED TELEPHONE BOXES

FIELD AND BACKGROUND OF THE INVENTION

The present invention relates to coin operated telephone boxes containing standard coin receiving mechanisms, electronic devices and circuitry, and coin return mechanisms, and with telephone voice receiving and transmitting instruments or handsets attached via a cable to the boxes. More particularly, the invention relates to coin operated telephone boxes of the type that have: a principal section defined by an outer face plate which includes a coin payment slot, a coin return lever or button, a dialing key pad including dialing buttons or keys, and a telephone handset cradle; and a second section containing a locked compartment within which coins are stored, and a return coin unit including a top pivoted front coin return door.

Coin operated telephone boxes of the type described above have been generally illustrated in U.S. Pat. No. 3,752,927 granted to K. D Bartley et al, U.S. Design Pat. No. Des. 229,426 granted to G. M. Janda et al, and in U.S. Pat. No. 5,018,193 granted to J. R. DeArkland. It will be noted that the face plates of the principal or upper sections of each of the telephone boxes illustrated in these patents includes a lower rectangular panel area. These panel areas, in the commercially available coin operated telephone boxes, are most frequently used to display telephone operating instructions for local and long distance dialing.

It is a general object of the present invention to provide an improved replacement face plate for the principal section of coin operated telephone boxes which face plate is interchangeable with the original face plate of such boxes and which face plate includes one or more additional framed information panel areas for dialing information and/or one or more framed advertising panel areas to promote products and services directly to the pay phone user.

It is a further object of the invention to provide a replacement face plate for the principal sections of public and private pay telephone boxes which includes framed panel areas for containing and displaying interchangeable advertising information messages relating to available products and services.

Other objects and advantages of the invention will be apparent from the following summary and description of the invention taken together with the accompanying drawing figures.

SUMMARY OF THE INVENTION

The present invention relates to novel interchangeable face plates for the principal section of commercially available coin operated telephone boxes. Such face plates of coin operated telephone boxes, on originally supplied commercial equipment, generally have an upper coin payment slot, an upper port for a coin return lever or button, a centrally located dialing key pad area with openings for the dialing buttons or keys of the telephone apparatus, and means above the key pad area for mounting a telephone handset cradle. Original equipment face plates of coin operated telephone boxes also usually include upper and lower rectangular panels used to display telephone operating instructions for local and long distance dialing and a small rectangular panel area directly above the key pad area for the display of the telephone number assigned to the box.

The replacement face plates of the present invention include one or more additional dialing information panel areas and/or one or more framed advertising panel areas to promote products and services directly to the dialing phone user. These additional framed panel areas are generally of rectangular configuration and are usually located on one side or both sides of the key pad area. The frames defining these additional panel areas are mounted to the outer side of the face plate by screw fasteners applied either from the face side of the plate or from the rear side of the plate. Where the panel frames are attached to the face plate from the face side thereof security screws are used as the fasteners. Printed interchangeable information and/or advertising cards of appropriate size and shape are insertable into the frames of the additional panel areas from the face side of the face plates and are maintained therein by one or more security screws.

BRIEF DESCRIPTION OF THE DRAWING FIGURES

In the accompanying drawing sheet:

FIG. 1 is a front elevation view of a face plate for a coin operated telephone box in accordance with the present invention showing the arrangement of a coin slot, port for a coin return lever or button, centrally located key pad area with openings for the dialing buttons or keys of the telephone apparatus of box, open area above the key pad area for mounting a telephone handset cradle, upper and lower rectangular openings defining panel areas used to display telephone operation instructions for local and long distance dialing, a small rectangular opening directly above the key pad area for display of the telephone number assigned to the telephone box, and rectangular side frames defining additional information panel areas or advertising panel areas to promote products and services to the dialing phone user;

FIG. 2 is a right side elevation view of the face plate of FIG. 1 showing the raised side configuration of the rectangular side frame on the right side of the face plate;

FIG. 3 is a front perspective view of one form of a rectangular side frame for defining an additional advertising panel area for the face plate of FIG. 1; and FIG. 4 is a front perspective view of another form of a rectangular side frame for defining an additional advertising panel area for the face plate of FIG. 1.

DETAILED DESCRIPTION OF THE INVENTION

Referring initially to FIG. 1 of the drawing sheet, there is illustrated, in a front elevation view, the replacement face plate 10 for a coin operated telephone box (not shown) in accordance with the present invention. The face plate 10 includes in its upper left corner area a coin slot 12 for the receipt of telephone call payment coins in amounts and number as directed by local call instruction information set forth in a panel area of the face plate or as directed by a telephone system operator handling a call. In the upper right corner area of the face plate there is located a port 14 for a coin return lever or button. A key pad area is centrally located on the face plate with openings 16 for the dialing buttons or keys of the telephone apparatus. Located above the key pad area is an opening 18 through which is mounted a telephone handset cradle (not shown).

Elongated rectangular opening 20 (above the cradle opening 18) and elongated rectangular opening 22 (below the key pad area openings 16) are provided for back mounting of display cards containing telephone operation instructions for local and long distance dialing. A small rectangular opening 24 (located directly above the key pad area openings 16) is provided for back mounting of a card insert bearing the telephone number assigned to the telephone box to which the face plate is mounted.

In accordance with the present invention, and not heretofore incorporated in telephone face plates, there are mounted on the right side and on the left side of the face plate, proximate the key pad area openings, rectangular frames 26 and 28, respectively, for the mounting of interchangeable advertising panel cards to promote products and services to the dialing phone user. The frame 26 is shown to be of a type that is mounted to the face plate 10 from the face side thereof by security screws 26a. The frame 28 is shown to be of a type that is mounted to the face plate 10 by machine screws applied through the face plate from the back side thereof. In FIG. 1 an ad card AC is shown to be positioned in the frame 26 and such card is maintained therein by a security screw 26b. The frame 28 is also provided with a security screw 28b for maintaining an ad card within the frame. An opening 30 is provided for the cable leading to the telephone handset.

FIG. 2 is a right side elevation view of the face plate 10 of FIG. 1 showing by dashed outline the location of the upper opening 20 and lower opening 22 and the opening 18 for mounting a telephone handset cradle. The side edge of the ad frame 26 is also shown with its mounting security screw fasteners 26a shown in dashed outline.

FIG. 3 is a front perspective view of the form of ad frame 26, in accordance with the present invention, that may be mounted to the telephone box face plate 10 from the face side thereof by security screws 26a applied through frame holes 26c and threaded into the face plate. The frame 26 is shown to have a peripheral rear ridge portion 26d (extends down both side legs and across the bottom leg of the frame) whereby when the frame 26 is mounted to the face plate 10 space is provided for slipping an ad card AC downwardly into the frame. The ad card is maintained in the frame 26 by the security set screw 26b threaded into threaded frame hole 26e.

FIG. 4 is a front perspective view of the form of ad frame 28, in accordance with the invention, that may be mounted to the face side of the telephone box face plate 10 by machine screws 28a extending through the face plate from the back side thereof and threaded into the side legs of the frame at rear side thereof. The frame 28 is shown to have a peripheral rear ridge portion 28d (extends down both of the side legs and across the bottom leg of the frame) whereby when the frame 28 is mounted to the face plate 10 space is provided for slipping an ad card AC downwardly into the frame. The ad card is maintained in the frame 28 security set screw 28b threaded into threaded frame hole 28e.

In the specification and drawing figures there has been set forth preferred embodiments of the invention. It is to be understood that the coin telephone box face plate of the invention may include one or more ad frames defining additional information panel areas or advertising panel areas positioned on either or both sides of the face plate proximate the key pad area. Although specific terms have been employed to describe the invention, they are used in a generic and descriptive sense only and not for purposes of limitation, the scope of the invention being defined in the following claims.

What is claimed is:

1. In a coin operated telephone unit having: a principal section defined by an outer face plate including a coin payment slot, a coin return mechanism, a dialing key pad area having dialing keys, a telephone handset cradle, and dialing information panels; and a second section containing a locked compartment within which coins are stored, and a return coin unit including a top pivoted front coin return door: an improved outer face plate for the principal section of said coin operated telephone unit including an external rectangular frame member affixed to said face plate proximate one side of the dialing key pad area of said plate and defining through its periphery a framed panel area, said frame member being defined by vertical side legs and horizontal upper and lower legs and having a peripheral rear ridge portion extending along both of said side legs and said lower leg for positioning said frame in spaced relationship with respect to said plate and for supporting an advertising panel card interchangeably insertable into said frame between said upper leg and said plate, and said upper leg of said frame member being provided with security screw means to maintain said advertising panel card within said frame.

2. The improved outer face plate for the principal section of a coin operated telephone unit as claimed in claim 1 wherein said frame member is affixed to said face plate by security screw means applied through said frame member and threaded into said plate.

3. The improved outer face plate for the principal section of a coin operated telephone unit as claimed in claim 1 wherein said frame member is affixed to said face plate by screw means applied through said plate from the rear side thereof and into said frame member.

4. In a coin operated telephone unit having: a principal section defined by an outer face plate including a coin payment slot, an opening for a coin return mechanism, a dialing key pad area having openings for a set of dialing keys, an opening for the mounting of a telephone handset cradle, and openings for dialing information panels; and a second section containing a locked compartment within which coins are stored, and a return coin unit including a top pivoted front coin return door: an improved outer face plate for the principal section of said coin operated telephone unit including two external rectangular frame members affixed to said face plate with each of said frame members located on one side of the dialing key pad area of said plate, said frame members defining through their peripheries framed panel areas, said frame members being each defined by vertical side legs and horizontal upper and lower legs and having a peripheral rear ridge portion extending along both of said side legs and said lower leg for positioning said frames in spaced relationship with respect to said plate and for supporting therein advertising display cards which are interchangeably insertable into said frames between said upper legs thereof and said plate, and said upper legs of said frame members being provided with security screw meads to maintain said advertising display cards within said frames.

5. The improved outer face plate for the principal section of a coin operated telephone unit as claimed in claim 4 wherein said frame members are affixed to said face plate by security screw means applied through said frame members and threaded into said plate.

6. The improved outer face plate for the principal section of a coin operated telephone unit as claimed in claim 4 wherein said frame members are affixed to said face plate by screw means applied through said plate from the rear side thereof and into said frame members.

* * * * *